United States Patent
Perrone et al.

(10) Patent No.: US 12,219,254 B2
(45) Date of Patent: Feb. 4, 2025

(54) METHOD, APPARATUS AND SYSTEM TO COMBINE FRAME IMAGE AND EVENT DATA

(71) Applicant: Prophesee, Paris (FR)

(72) Inventors: Daniele Perrone, Noisy le Grand (FR); Thibault Leblanc, Paris (FR); Sylvain Brohan, Le Perreux sur Marne (FR)

(73) Assignee: Prophesee, Paris (FR)

( * ) Notice: Subject to any disclaimer, the term of this patent is extended or adjusted under 35 U.S.C. 154(b) by 73 days.

(21) Appl. No.: 18/003,302

(22) PCT Filed: Jun. 23, 2021

(86) PCT No.: PCT/EP2021/067128
§ 371 (c)(1),
(2) Date: Dec. 23, 2022

(87) PCT Pub. No.: WO2021/259994
PCT Pub. Date: Dec. 30, 2021

(65) Prior Publication Data
US 2023/0254579 A1    Aug. 10, 2023

(30) Foreign Application Priority Data

Jun. 23, 2020 (EP) .................................... 20305687

(51) Int. Cl.
*H04N 23/68* (2023.01)
*H04N 23/80* (2023.01)
*H04N 23/83* (2023.01)

(52) U.S. Cl.
CPC ......... *H04N 23/683* (2023.01); *H04N 23/815* (2023.01); *H04N 23/83* (2023.01)

(58) Field of Classification Search
CPC ...... G06T 5/73; H04N 23/683; H04N 23/815; H04N 23/83; H04N 25/47
See application file for complete search history.

(56) References Cited

U.S. PATENT DOCUMENTS

| 8,687,913 B2 | 4/2014 | Lin |
| 9,554,048 B2 | 1/2017 | Silverstein |
| 10,194,101 B1 | 1/2019 | Fontvielle |

FOREIGN PATENT DOCUMENTS

| CN | 108074222 A | 5/2018 |
| EP | 2454876 B1 | 5/2012 |

(Continued)

OTHER PUBLICATIONS

Translation of Chinese publication No. CN106991650A (Year: 2017).*

(Continued)

*Primary Examiner* — Nicholas G Giles

(57) ABSTRACT

An image enhancement method, comprising:
  obtaining a reference image frame from of a scene, by a frame-based sensor, wherein the reference image contains artifacts and has an exposure duration;
  obtaining a stream of events, by an event-based sensor which is synchronized with the frame-based sensor, at least during the exposure duration, wherein the events encode brightness changes of the scene corresponding to the reference image; and
  deriving a corrected image frame without the artifacts from the reference image frame using the stream of events.

17 Claims, 6 Drawing Sheets

(56) References Cited

FOREIGN PATENT DOCUMENTS

| WO | WO 2014042894 A1 | 3/2014 |
| WO | WO 2016107961 A1 | 7/2016 |

OTHER PUBLICATIONS

Scheerlinck et al., "CED: Color Event Camera Dataset," IEEE/CVF Conference on Computer Vision and Pattern Recognition Workshops, IEEE, Jun. 16, 2019, pp. 1684-1693.

Gallego et al., "Event-based Vision: A Survey," arxiv.org, Cornell University Libraray, Cornell University, Ithaca, NY, Apr. 17, 2019, pp. 1-25.

Pan et al., "Bringing a Blurry Frame Alive at High Frame-Rate with an Event Camera," 2019 IEEE/CVF Conference on Computer Vision and Pattern Recognition (CVPR), IEEE, Jun. 15, 2019, pp. 6813-6822.

Li et al., "Event-Based Vision Enhanced: A Joint Detection Framework in Autonomous Driving," 2019 IEEE International Conference on Multimedia and Expo (ICME), IEEE, Jul. 8, 2019, pp. 1396-1401.

\* cited by examiner

METHOD, APPARATUS AND SYSTEM TO COMBINE FRAME IMAGE AND EVENT DATA

FIELD OF INVENTION

The present invention relates to image processing technology, especially to image enhancement.

BACKGROUND

Traditional image and video cameras and systems are commonly limited by several factors. In particular, at the sensor design level, in order to make image sensors smaller, with lower cost and with better sensitivity, image sensors often use rolling shutter readouts. While this readout offers advantages, it can lead to artifacts due to motion happening while a frame is captured.

In addition, when a video or an image is captured by a traditional camera, the settings of the camera offer different trade-offs for the acquisition, like the typical exposure/ISO trade-off, such as changing the exposure duration, wherein more or less light is integrated, but there is still risk that motion produces blurry images. Keeping a small exposure duration may reduce the motion blur, but for low light situation this will produce a too dark image. For the latter, it is common to compensate for a smaller input signal by increasing the ISO gain of the sensor. However, this also amplifies the sensor's noise.

Moreover, some scenes have high lights and dark areas at same time. For these scenes, one has often to choose between an exposure that exposes well the high lights, and another one that better exposes the dark areas. A typical solution to this problem is to combine several images and compress the measured light intensity using some non-linear function to produce an HDR image. However, this solution requires the alignment of several images, usually from 2 to 8, and thus is too complex computationally for high frame rate videos for the traditional image and video acquisitions.

In the art, there are already some solutions that attempt at compensating the abovementioned limits of traditional imaging and video acquisitions. For example, WO 2014042894A1, U.S. Pat. No. 10,194,101B1 and U.S. Pat. No. 9,554,048B2 disclose how to remove specific rolling shutter effects, WO 2016107961A1, EP2454876B1 and U.S. Pat. No. 8,687,913B2 discloses how to remove blur without rolling shutter effects, and some other paper discusses computing high dynamic range (HDR) images and video without removing rolling shutter and blur. However, they are typically tailored to a specific artifact and/or they carry an important computational complexity.

The invention aims to improve these drawbacks.

SUMMARY

In this regard, according to one aspect of the invention, it is provided an image enhancement method, comprising:
  obtaining a reference image frame of a scene, by a frame-based sensor, which contains artifacts and has an exposure duration;
  obtaining a stream of events, by an event-based sensor which is synchronized with the frame-based sensor, at least during the exposure duration of the reference image frame, wherein the events encode brightness changes of the scene corresponding to the reference image; and
  deriving a corrected image frame without the artifacts from the reference image by means of the stream of events.

Therefore, according to such an arrangement according to the present invention, frame image and event data are combined to remove image artifacts from the frame image, such as wobble (also known as jello effect), skew, spatial aliasing, temporal aliasing, especially for the scenes with motion in low light and with a large dynamic range.

In an embodiment according to the present invention, the reference image frame is obtained at a reference time, and the step of deriving a corrected image frame comprises a step of image time shifting, wherein the reference image frame is shifted to the corrected image frame at a target time inside or outside the exposure duration by establishing a relationship between the events and the reference image frame and accumulating the brightness changes encoded by the events obtained during a time interval between the reference time and the target time [t_r,t], so as to shift an image as it was acquired at a different time, i.e. the target time.

Furthermore, according to the present invention, the reference image frame is a blurry frame, and the method comprising a step of image deblurring for recovering the blurry frame to a sharp image, so as to, for example, obtain a sharp reference image when the exposure duration is too large.

Alternatively, the method according to the present invention comprises a step of reblurring the corrected image frame, so as to simulate, from a sharp image, a larger exposure duration effect which makes the image more real especially in fast motion scene.

Alternatively, the method according to the present invention comprises a step of non-linear compensation for compensating non-linear processing both in the image frame and in the events.

Moreover, in another embodiment of the present invention, the reference image has a first resolution and/or a first color space, and the stream of events has a second resolution and/or a second color space, which are different from the first resolution and/or the first color space, and wherein the method further comprises a step of resolution and color restoration for compensating resolution and/or color space differences between the reference image and the stream of events.

In yet another embodiment of the present invention, the image frame is generated by a frame based camera which contains a rolling shutter sensor containing rows of sensor elements (pixels). In addition, for example, the step of deriving a corrected image frame is proceeded for each row of the rolling shutter sensor in sequence.

In yet another embodiment of the present invention, the method comprises generating a plurality of the corrected image frames distributed at different times in the exposure duration.

Alternatively, the method according to the present invention comprises aligning a plurality of the corrected image frames derived in different exposure durations.

According to another aspect of the invention, it is further provided an image enhancement apparatus, comprising:
  a frame based camera containing a frame-based sensor;
  an event based camera containing an event-based sensor, wherein the frame based camera and the event based camera observe the same scene and respectively generate image frames and a stream of events corresponding to the scene, and the frame based camera and the event based camera are synchronized; and a processor for executing the abovementioned method.

Alternatively, according to yet another aspect of the invention, it is further provided another image enhancement apparatus, comprising:
- a camera adapted to generate image frames and a stream of events corresponding to the scene;
- a processor for executing the abovementioned method.

Furthermore, according to yet another aspect of the invention, it is further provided an image enhancement system which comprises:
- a capture module, adapted to obtain a reference image which may contain artifacts and having an exposure duration, and to obtain a stream of events corresponding to the scene during the exposure duration of the reference image frame;
- an image enhancement module, adapted to derive a corrected image frame without the artifacts from the reference image by means of the stream of events.

In one embodiment of the system according to the present invention, the image enhancement module comprises an image time shifting module for shifting the reference image frame to the corrected image frame at an arbitrary time (t) inside or outside the exposure duration by accumulating the brightness changes encoded by the events.

In another embodiment of the system according to the present invention, the image enhancement module comprises a non-linear compensation module for compensating non-linear processing in the image frame and in the events.

In yet another embodiment of the system according to the present invention, the reference image has a first resolution and/or a first color space, and the stream of events has a second resolution and/or a second color space, which are different from the first resolution and/or the first color space, and wherein the image enhancement module further comprises a resolution and color restoration module for compensating resolution and/or color space differences between the reference image and the stream of events.

The present invention extends the capabilities of a standard frame based image sensor by pairing it with an event-stream, for example from a DVS sensor, in order to extend the traditional tradeoffs of image sensors and allow the capture of video and images that better match the scene characteristics. In this regard, the present invention allows the capturing of images and videos of scenes with motion in low light and with a large dynamic range with limited computational complexity requirements.

BRIEF DESCRIPTION OF THE DRAWINGS

Other features and advantages of the present invention will appear in the description hereinafter, in reference to the appended drawings, where.

DESCRIPTION OF EMBODIMENTS

Figure 1:
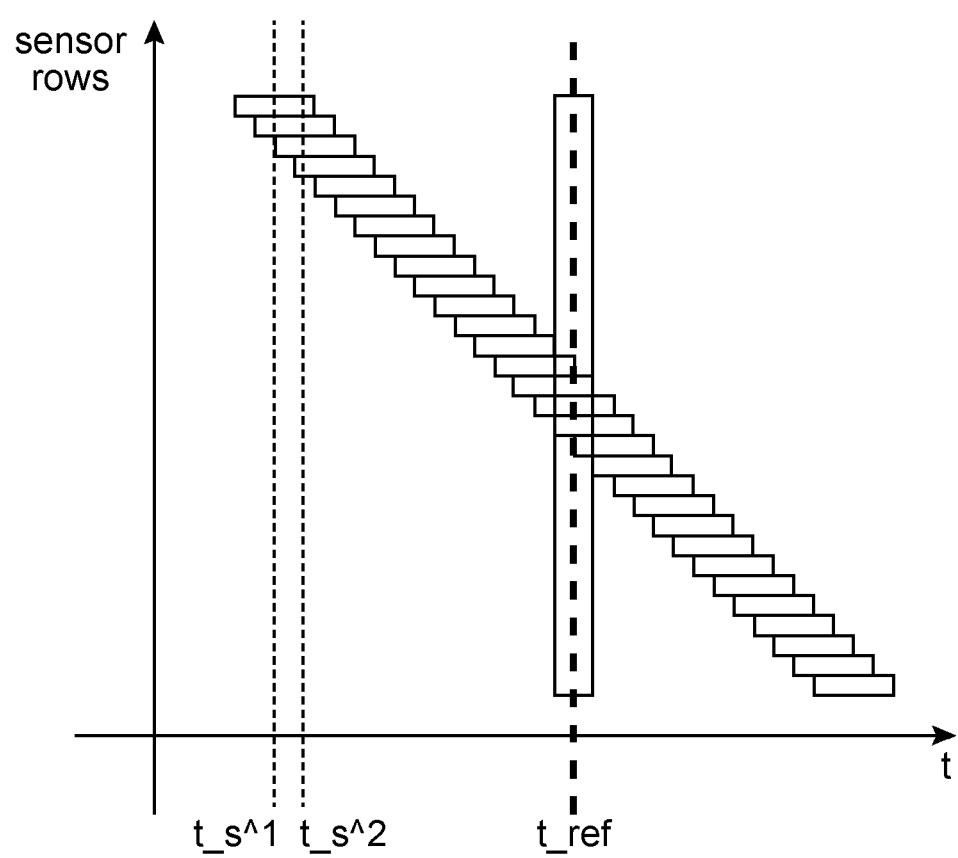
FIG. 1 illustrates exposure windows for an image captured by a frame based sensor and for an image corrected by the method according to the invention.

The context of the present invention comprises an exemplary image capture architecture which comprises a traditional image frame based camera and an event based camera, wherein the frame based camera and the event based camera observe the same scene in which an object or the entire scene are moving relative to the frame based camera and the event based camera, and the framed based camera captures and generates image frames of the scene (including the moving objects) and the event based camera generates a stream of events corresponding to the same scene including the moving objects captured during the acquisition of the image frames (frame period), and possibly before and after.

In particular, the frame based camera, for example, has a rolling shutter sensor which has rows of sensors, such as CMOS sensors, wherein the rows of the sensors scan across the scene row by row rapidly in sequence. Therefore an image is captured or generated when the scanning from the first row of the sensors till the last row of the sensors during one period called frame period.

The event-based camera contains an asynchronous vision sensor facing the same scene observed by the frame based camera and receives light from the same scene. The asynchronous vision sensor comprises an array of sensing elements (pixels), each including a photosensitive element. Each sensing element (pixel) produces events corresponding to variations of light in the scene. The asynchronous vision sensor could be a Contrast Detection (CD) sensor or a dynamic vision sensor (DVS).

Alternatively, the present invention may use another possible exemplary image capture architecture which comprises a single sensor that records both frames and events, such as a DAVIS sensor or an asynchronous time-based image sensor (ATIS).

In the present invention, it is necessary to synchronize the frame data to the event data.

In particular, in the case of the combination of an image frame-based sensor and a DVS or CD sensor, it is possible to synchronize the time bases of the two sensors by exchanging synchronization signals between the sensors.

For example, one possibility is to rely on the flash out signal from a frame-based camera typically used to trigger the flash during the exposure duration of the frame acquisition, and use this signal to carry the start of the exposure duration to the CD sensor. The CD sensor can then timestamp the received signal in its own time base, so that the processing element can relate the event timestamps to the exposure duration of the frame-based sensor.

Such synchronization is important, since the present invention is based on the relationship between frames and events, hereinafter their relationship will be discussed.

The events of an event-based camera (DVS or CD) are related to the temporal evolution of brightness in the scene. The event-based sensor records "events" that encode changes in brightness with respect to a reference status. We refer to this reference status as a reference image $L(t\_r)$ at a reference time $t\_r$. Then the event-based camera produces a positive event at (pixel) position x at time t If $$\log(L(x,t)/L(x,t\_r)) > c+$$

or a negative event if $$\log(L(x,t)/L(x,t\_r)) < c^-$$

Where $c+$ and $c^-$ are positive and negative thresholds respectively. Note that the use of the logarithmic function here is merely an example, but these relationships can apply to any monotonic and continuous function. We define also by $e^p$ the polarity associated to a particular event e. $e^p$ can be written as $$e^p = \tau(\log(L(x,t)/L(x,t\_r)), c+, c-)$$

where $\tau(x, c+, c-) = 1$ if $x \geq c+$, 0 if $x \in (-c-, c+)$ and $-1$ if $x \leq -c-$.

If in a time interval $T = [t\_r, t\_n]$ we receive at position x a train of events $E[t\_r, t\_n] = e1, \ldots, ek$, we have $$\Sigma_{e \in E[t\_r, t\_n]} e^p =$$
$$T(\log(L(x, t1)/L(x, t\_r)), c+, c-) + \cdots + T(\log(L(x, t\_n)/L(x, t\_(n-1))),$$
$$c+, c-) \approx \log(L(x, t\_n)/L(x, t\_r)), c+, c-)$$

By defining $h(x, E[t\_r, t\_n], c+, c-) = \Sigma_{e+ \in E[t\_r, t\_n], ep > 0} c++ \Sigma_{e- \in E[t\_r, t\_n], ep < 0} c-$ we have $$h(x, E[t\_r, t\_n], c+, c-) \approx \log(L(x, t\_n)/L(x, t\_r), c+, c-) \quad (1)$$

Wherein, the Equation (1) applies independently to each pixel.

In this case, the Equation (1) establishes a relationship between two images at different times, and events received between these times. Next, it is discussed how to use this relationship to manipulate and improve images according to the present invention.

In the context of the present invention, it also comprises a processor or a computing unit which is adapted to execute an image enhancement method based on the following modules.

Image Time Shifting Module

From the Equation (1), it is possible to derive a sharp image $L(x,t)$ at an arbitrary time t from a sharp reference frame $L(x, t\_r)$ with $t\_r < t$ by accumulating the brightness changes encoded by the events $E[t\_r, t]$ and updating the brightness of $L(x, t\_r)$ as $$L(x,t) \approx L(x, t\_r) e^{h(x, E[t\_r, t], c+, c-)} \quad (2)$$

If $t\_r > t$ then $h(x, E[t\_r, t], c+, c-) = -(\Sigma_{e+ \in E[t\_r, t], ep > 0} c++ \Sigma_{e- \in E[t\_r, t], ep < 0} c-)$.

The Equation (2) allows to estimate an image at an arbitrary time t, given a reference image at time $t\_r$ and events recorded in the time interval $[t\_r, t]$. This equation forms one of the fundamental modules of the method according the present invention, the image time shifting module, as it allows to "shift" an image as it was acquired at a different time.

Image Deblurring Module

The Equation (2) assumes that a reference image is available at a time $t\_r$. This might be true if the exposure duration is short enough (I.e., if the image is sharp). However, if the exposure duration is too long, it is not possible to have a sharp reference image available in case of motion in the scene or relative motion between the scene and the camera(s).

So it is necessary to assure a sharp image at $t\_r$ to shift. Mathematically, a blurry frame can be defined as:

$$B = 1/T \int_{f-T/2}^{f+T/2} L(t) dt$$

where B is the blurry image, f is a given time within the exposure duration and is used as reference time, T is the exposure duration and $L(t)$ is a sharp image at time t.

The Equation (2) can be substituted at the place of $L(t)$ and have:

$$L(f) \approx T * B / \int_{f-T/2}^{f+T/2} e^{h(E[f,t], c+, c-)} dt$$

The Equation (3) defines the image deblurring module, which allows recovering a sharp image at any arbitrary time within the exposure duration from a blurry image. With the image deblurring module and the image time shifting module, it is capable to reconstruct a sharp image at any given time t.

Image Reblurring Module

Sometimes a photographer or video-maker wants to keep/add some blur in his image/video. In this regard, an image can be simulated with arbitrary exposure duration $T\_n$ by simply averaging all the possible different images which happened during the exposure. If for example, a sharp image is reconstructed at time $t\_r$, and an image is centered at time $t\_r$ with exposure $T\_n$, it can be computed by doing $$B \approx L(t\_r)/T \int_{t\_r - T\_n/2}^{t\_r + T\_n/2} e^{h(E[t\_r, t], c+, c-)} dt$$

Equation (4) defines the image reblurring module, in which a larger exposure duration is simulated from a sharp image.

Resolution and Color Restoration Module

The modules defined above act on each pixel independently. Also, the above modules assume that there is a 1-to-1 correspondence between the event based sensor pixels, such as DVS sensor, and the frame pixels, and that c+ and c− are known for each pixel. However, this may not be the case even for combined sensors. For example, in the WO 2020/002562 A1 titled "Image Sensor with a Plurality of Super Pixels", there is no 1-to-1 correspondence between the event pixels and frame pixels although they are on the same sensor.

Therefore, in a more general manner, a system may combine two separate sensors with different spatial resolutions. Moreover, typical traditional sensors use a Bayer filter to produce color images. Likewise, it is possible to put a Bayer filter on the event-based sensor. In this case, the different operations mentioned above (deblurring, time-shifting, and reblurring) need to be applied per color channel. However, most of the event-based sensors do not have a Bayer filter, and only record changes in brightness. Therefore, the different modules mentioned above can only be applied to grayscale images.

Therefore, in order to enable the use of frame and event-based sensors with different numbers of pixels (a.k.a. sensor resolution) and to account for the differences in color space between frame and event sensors, the present invention proposes a resolution and color restoration module.

Such a module can refer to the mapping from a recorded buffer of events to the buffer of events ready to use for the deblurring, image shifting and reblurring modules, independently or in series. It can also perform this transformation at different stages of the method, or at the output.

In addition, the sensor being not ideal, and more specifically having thresholds that can vary with different factors, and being subject to noise, the output of the resolution and color restoration module is still expected to ideally follow the mathematical definition of "color-referenced" events. This resolution and color restoration module is therefore also acting as a noise and artifact removal algorithm.

In general, this module can be implemented in several ways, as follows, for each of the resolution, color restoration and idealization problems tackled by either:

Using approaches in series and independently implemented such as a reprojection algorithm, that can be based on calibrated distortion, intrinsic and extrinsic parameters of the two sensors, machine learning based or mixing an approach based on calibrated distortion, intrinsic and extrinsic parameters with a machine-learning approach for refinement, pipelined with a colorization algorithm that can be machine learning-based or model-based, pipelined with a noise removal module, also possibly being machine learning-based;

Using a machine learning approach on two of these modules and pairing the obtained model with the remaining module;

Using an end-to-end machine learning approach to model the whole mapping.

Wherein these approaches can be put in series in any order.

Next, it is given some examples of different submodules of implementing the resolution and color restoration module.

Event-Based Resolution and Color Restoration Submodule

This submodule transforms the buffer of events before applying the previous mentioned modules.

In fact, the frame and the event sensor are exposed to the same scene. It is thus possible to map the original buffer of events $e=(e\_i)\_i=1 \ldots N$ acquired during the blurry frames' exposure duration to a buffer $e'=(e'\_i)\_i=1 \ldots N'$ such that the coordinates of the events $e'\_i$ are in the coordinate system of the frame sensor. Notice that the set $e'$ does not need to have the same number of events as $e$.

Also, applying the image shifting module, image deblurring module and image reblurring module to color images can be done by preprocessing the events stream to determine which change of color channel has triggered a change in luminosity.

This preprocessing can be thought of as, after choosing a 3D color space, finding a mapping of a buffer of events that is already aligned with the frame based coordinates $e'=(e'\_i)$ $i=1 \ldots N'$ to a buffer of color-referenced events $e''=(e''\_i)\_ i=1 \ldots N''$ such that $e''\_i$ exists at pixel x when either $\log(Ch(x,t)/Ch(x,t\_r)) > c^+\_ch$ and is then attributed polarity 1 and channel Ch $\log(Ch(x,t)/Ch(x,t\_r)) < c^-\_ch$ and is then attributed polarity 0 and channel Ch With Ch being any of the three color channels and $c+\_ch$ and $c-\_ch$ are color thresholds depending on the $e'$ to $e''$ mapping algorithm. An event in $e''$ has therefore an additional color channel information. Also in this case, for each event in $e'$ we might generate several events in $e''$ or none, according to the used mapping function.

So to go from the set $e$ to the set $e''$, in general, we need a model or learn a function $f(e) \rightarrow [e'']$ that given an event in input, generates a list of events in output with different color references.

By knowing the intrinsic parameters of each camera (camera matrix K and lens distortion parameters D), the rotation R and translation T between the two cameras and a depth map of the scene, we can compute a map M that for each pixel of the frame camera gives the coordinate on the event camera. This map can then be used to transform the coordinates of each event to bring it to the coordinates of the frame camera. Then, we can represent an event as a vector $v=[x, y, t, p]$ where $(x,y)$ is the position of the event, t is the time and p is the polarity; or as a binary vector $b=[0 \ldots 0\ 1\ 0 \ldots 0]$ or floating point vector $\hat{v}f=[f\_1, f\_2, f\_3, f\_4]$ that is encoding v in a different space. Then $f(e)$ can be a linear or non linear function on v, b or $\hat{v}f$ that gives in output a matrix where each column is a vector $[x,y, t, p, ch]$ where ch is the color channel. The matrix can have an additional row denoting if the column is a valid event or not. This function can be a concatenation of linear operator, of which a warping function obtained from M, or it can be learned given enough examples of input/output pairs.

Intermediate Resolution and Color Restoration Submodule

Another possible example is by acting on intermediate maps that are used by the modules above. First, consider that the time shifting, deblurring and reblurring modules all act on the quantities $h(E[t\_i, t\_j], c-, c+)$ which can be discretized in timebins for computational efficiency.

The inputs to the time shifting, deblurring and reblurring modules can be collections of binned sums of events. For example, using a binning with a fixed timebin width $\Delta T$, one can use the quantities $(h(E[t\_0+i*\Delta T, t\_0+(I+1)*\Delta T], c-, c+)\_I=1 \ldots B$ as input. The discretization can also be done with a fixed number of events by using the quantities $(\Sigma\_{e+\in i\Delta k \ldots (i+1)*\Delta k, ep<0} c^+ + \Sigma\_{e-\in i*\Delta k \ldots (i+1)*\Delta k, ep<0} c^-)\_i= 1 \ldots B$ where $\Delta k$ is the width of the bins in terms of number of events.

This intermediate resolution and color restoration submodule can be implemented by taking this into account and therefore having the input and outputs of its constituting modules, whether they are run separately or abstracted altogether through a machine learning pipeline. In practice the quantities $h(E[t\_I, t\_j], c-, c+)$ can be represented as a matrix $H \in R^{m\_eb \times n\_eb \times B}$ where $m\_eb \times n\_eb$ is the resolution of the event based sensor and B is the number of time-bins, either with a fixed time-width or with a fixed number of events. Therefore this module can be defined as a function $f: R^{m\_eb \times n\_eb \times B} \rightarrow R^{m\_fb \times b' \times ch}$ transforming therefore the matrix in an equivalent having the same dimension of the frame and a chosen number of bins B'. Also in this case, using the calibration of the cameras, f can include a warping operator obtained from the camera calibration, or it can be a guided filter or a joint bilateral filter, or it can be learned using pairs of input/outputs.

Post Resolution and Color Restoration Submodule

Finally, the abovementioned modules can be applied by converting the frame F to the resolution of the events and removing color information, then deblurring such version of the frame that we will denote with $F^d$, and then transform the deblurred $F^d$ that we will denote with $D^d$ to the original frame resolution and reapply the color information.

In this case the geometric mapping M that maps the two camera pixels is applied to deblur Fd. It's also possible to keep the original resolution of the frame camera, and apply some simple interpolation to the quantities $h(E[t\_I, t\_j], c-, c+)$. Once we obtain $D^d$, we need a function f that transforms it to a color version (and with the right details at the resolution of the frame camera). This function can be a guided filter or a joint bilateral filter, or it can be learned using pairs of input/outputs.

Non-Linear Compensation Module

The abovementioned modules can be applied to the image acquired from the frame based sensor before any non-linear processing done by the ISP or after. In the latter case, it is necessary to compensate the non-linear processing also in the events. Therefore, a non-linear compensation module shall be defined as follows.

Assuming the camera response function is the identity, the Equations (2), (3) and (4) describing the image time shifting, deblurring and reblurring modules can be written as $F\_1=F\_2*f((e\_i)\_i=1 \ldots N)$ where $F\_1, F\_2$ are frames and $(e\_i)\_i=1 \ldots N$ is an event stream and f is a transformation function.

Therefore, assuming the frame of interest is F_2, we can retrieve it by simple division.

If the camera response function is some function g, the above relation becomes $$g(F\_1)=g(F\_2*f((e\_i)\_i=1 \ldots N)$$

Non-linear processing often includes a gamma correction. In this setting, we have $$(F\_1)\hat{}\gamma=(F\_2)\hat{}\gamma*f((e\_1)\_I=1 \ldots N)\hat{}\gamma$$

Retrieving the frame of interest is obtained by $(F\_2)\hat{}\gamma=(F\_1)\hat{}\gamma/f((e\_I)\_I=1 \ldots N)\hat{}\gamma$ The non-linear compensation module applied on some function f of a buffer of events (e_i)_i=1 ... N is defined as producing the value f((e_i)_i=1 ... N)^γ in order to compensate for non-linearities in the frame based sensor's output function and be able to apply the frame processing modules mentioned above. Therefore, in general in this way we can deal with any function g that can be factorized as the gamma correction above. However, this approach cannot be used when we apply the reblurring module and if the function g is not factorizable. In this case, if g is invertible we can compute g⁻1 (F_1)=F_2*f((e_i)_i=1 ... N) and then when we obtain F_2, apply g(F_2) to obtained F_2 with the same response function as F_1.

In order to further explain the present invention, hereinafter some embodiments of exemplary methods according to the present invention are described, wherein these embodiments use the modules mentioned above to enhance the image quality of an imaging system, which uses an event stream to modify a captured image as it was captured in a different ideal setting.

FIG. 1 shows how rows in a rolling shutter sensor are exposed for one frame. Each black element represents an exposure window of a given row, and from one row to the other, the exposure window is shifted due to the rolling shutter since they are read in sequence by the sensor circuitry. It should be noted that the exposure windows have all the same exposure duration, or exposure time, but they start and end at a different time for each sensor row. The light grey vertical bar represents the exposure windows of a global shutter sensor at a target time that the present invention intents to recover, where all row exposure windows are aligned. In the present embodiment of FIG. 1, the rolling shutter sensor scans from the top (first) row to the bottom (last) row, so that a temporally distorted image (an image with artifacts) is captured.

For each row as shown in FIG. 1, a time $t\_s\hat{}r$ inside the exposure window is marked as reference. Alternatively, for a global shutter sensor, the exposure window starts and ends at the same time for all rows. In addition, a target time t_ref is also defined with a new target exposure duration (denoted with a grey bar shape).

In the following paragraphs, we will demonstrate how to transform/correct the image frame captured by the exposure windows of a rolling shutter sensor, as represented by black elements, to another one represented by the grey bar shape by using the method according to the present invention, as shown in FIG. 1, wherein for each row r of the rolling shutter sensor, we have the start of exposure duration se^r, the end of exposure duration ee^r, and a reference time t_s^r \in [se^r, ee^r]. A target exposure duration T_ref is also defined together with the target time t_ref.

Figure 2:
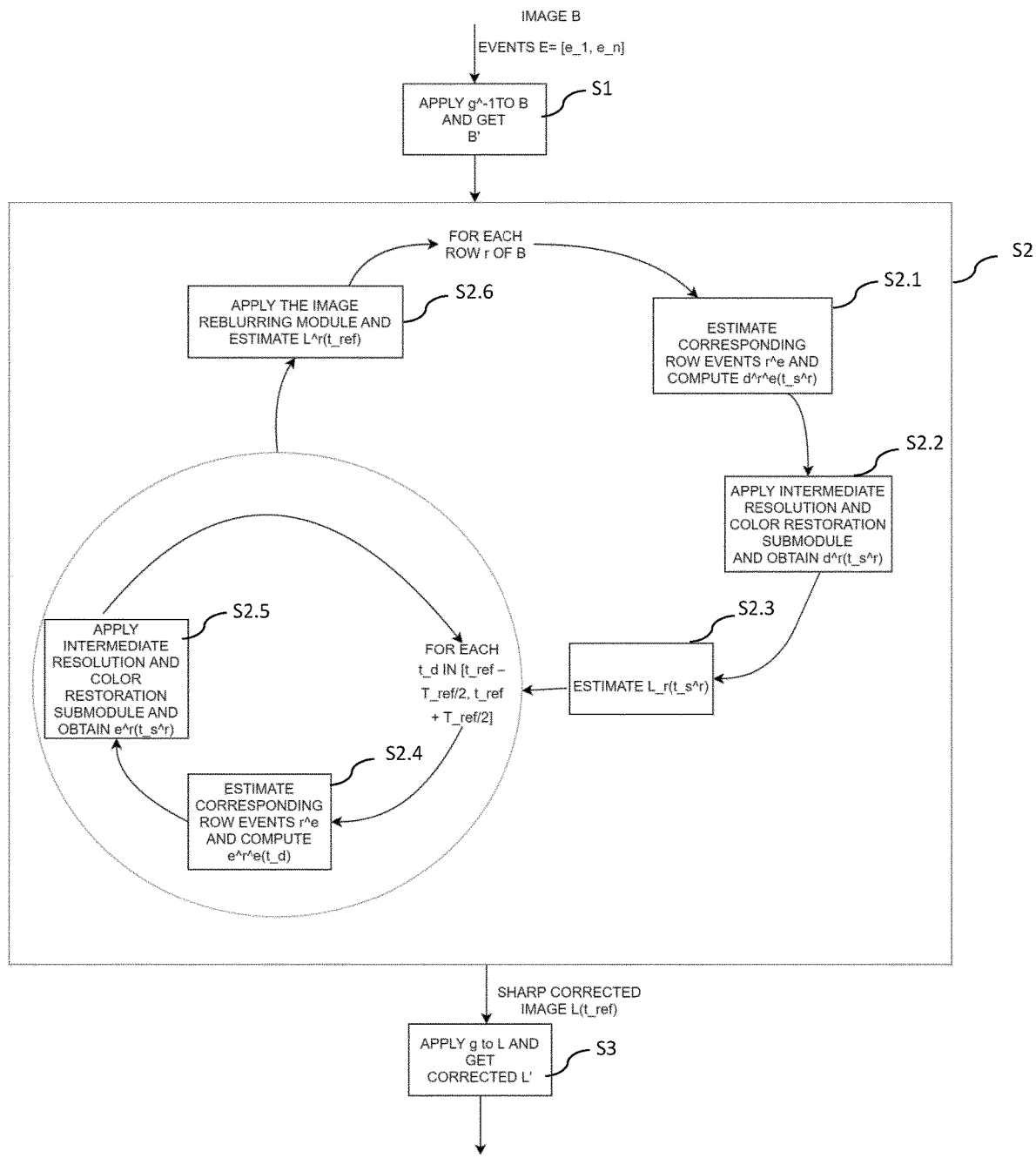
FIG. 2 illustrates a functional block diagram of a first exemplary method according to the invention.

FIG. 2 shows a first exemplary method according to the invention which comprises the following steps, wherein an image frame B is captured by rows of sensor elements of a rolling shutter sensor in a frame based camera, whose exposure window of each row is shown as black elements in FIG. 1, and a stream of events E=[e_1, e_n] corresponding to the scene depicted in image frame B is generated by an event based camera, and wherein the frame based camera and the event based camera has different resolution and color space.

Step S1: Invert the response function g by applying B'=g⁻¹(B)

Step S2: For each row r of B':

a. Apply the image deblurring module. This corresponds to:

i. Step S2.1: Estimate the corresponding row in the event stream r^e, and compute from the event streams a row $d\hat{}r\_e(t\_s\hat{}r)=1/T\int_{se\hat{}r}^{ee\hat{}r}e^{h(E\hat{}r\hat{}e[t\_s\hat{}r,t],c+,c-)}dt$.

ii. Step S2.2: If the event stream is at a different resolution and color of the image, apply the intermediate resolution and color restoration submodule to obtain a row d^r(t_s^r) corresponding to the row r of B.

iii. Step S2.3: Finally compute a sharp row at t_s^r as L^r(t_s^r)≈B'^r/d^r(t_s^r).

b. For each time t_d \in [t_ref−T_ref/2, t_ref+T_ref/2] apply the image time shifting module. This corresponds to:

i. Step S2.4: Estimate the corresponding row in the event stream r^e, and compute from the event streams a row $e\hat{}r\_e(t\_d)=e^{h(x,E[t\_s\hat{}r,t\_d],c+,c-)}$.

ii. Step S2.5: If the event stream is at a different resolution and color of the image, apply the intermediate resolution and color restoration submodule to obtain a row e^r(t_d) corresponding to the row r of B.

c. Step S2.6: Apply the image reblurring module and estimate the row r of image at time t_ref L^r(t_ref)=L^r (t_s^r)/T$\int_{t\_ref-T\_ref/2}^{t\_ref+T\_ref/2}$e^r(t)dt.

These steps S2.1 to S2.6 in Step 2 will be repeated until the last row of B is processed, and then move to a next Step 3.

Step S3: Apply g to L and get the final corrected image L', similar to the one which would have been captured by a global shutter sensor at the target time t_ref with the target exposure duration T_ref.

With these steps, it is possible to correct the image frame obtained by the frame based camera to a correct image using the stream of events.

In the above embodiment, the term of rows of the sensor(s) are merely used for clarity of the presentation. It should be understood that the above equations are applied pixel by pixel in each row. Likewise, due to different lens distortions, different sensor sizes and orientations, and distances of objects in the scene, a row in the frame-based sensor does not necessarily correspond to one row in the event-based sensor, but to one or several non-continuous curves in the event-based sensor. The term "estimate the corresponding row in the event stream" means carrying the operations for each of the pixels in the event-based sensor that lie on the one or several curves that corresponds to the row in the frame-based sensor. Consequently, each processing of the event data generated by the pixels in one row of the event-based sensor may use a different t_s^r depending on the frame-based sensor row it relates to.

Alternatively, the exposure duration T_ref can be short enough, so that no image reblurring module needs to be applied. In that case, there is no step c (Step S2.6). Having a large target exposure duration T_ref has only the effect of adding some artistic blur in the resulting image.

Figure 3:
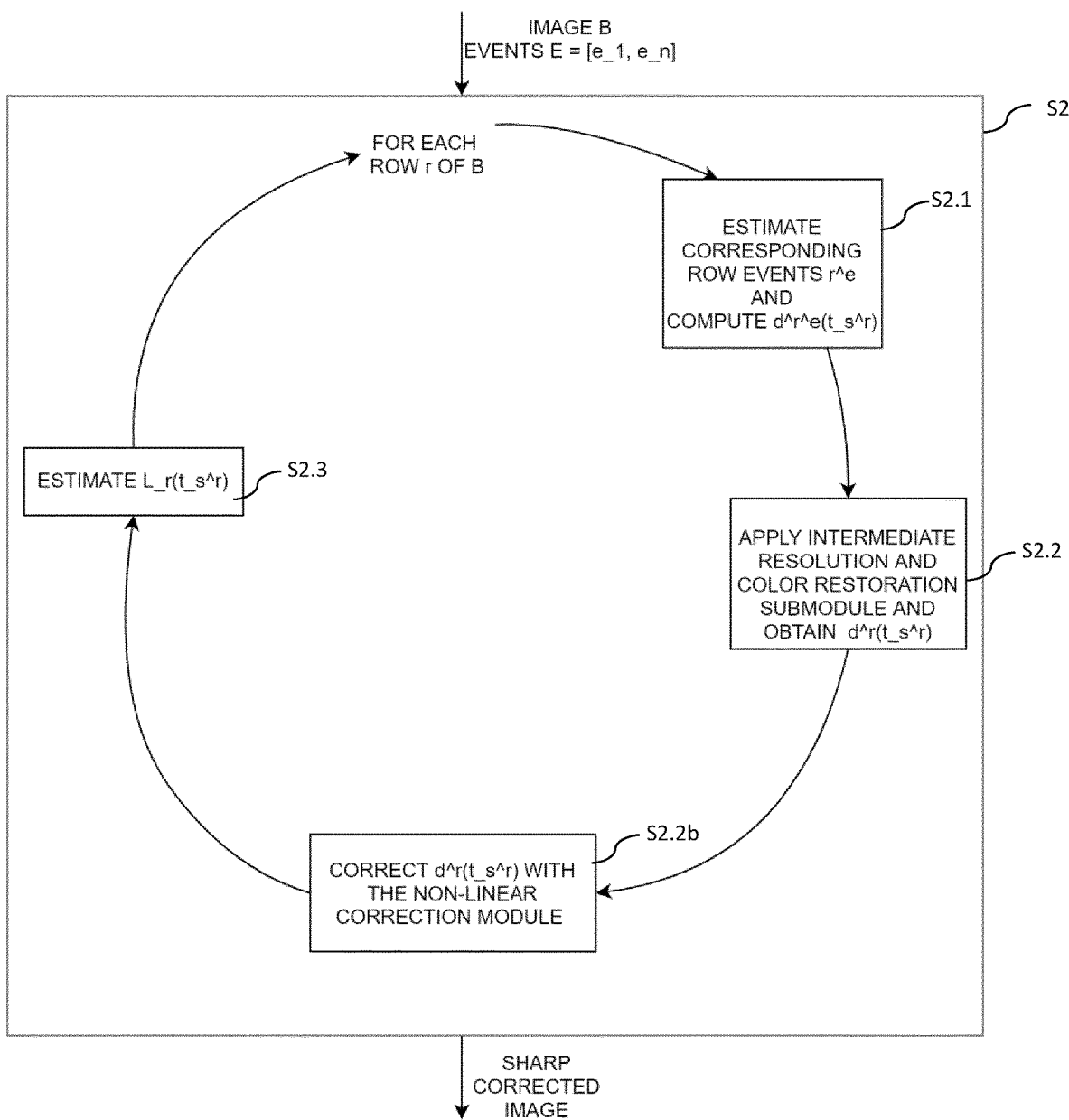
FIG. 3 illustrates a functional block diagram of a second exemplary method according to the invention.

FIG. 3 shows a second exemplary method according to the invention, wherein it is different from the first exemplary method in that the reblurring module is not used and the camera response function g is factorizable, and thus the non-linear response function can be corrected without inverting g. This second exemplary method comprises the following steps:

Step S2: For each row r of B:

Step S2.1: Estimate the corresponding row in the event stream r^e, and compute from the event streams a row d^r^e(t_s^r)=1T$\int^{Se^{\wedge}r}_{ee^{\wedge}r}e^{h(E^{\wedge}r^{\wedge}e[t\_s^{\wedge}r,t],c+,c-)}dt$.

Step S2.2: If the event stream is at a different resolution and color of the image, apply the intermediate resolution and color restoration submodule to obtain a row d^r(t_s^r) corresponding to the row r of B.

Step S2.2b: Correct d^r(t_s^r) with the non-linear correction module.

Step S2.3: Then finally compute a sharp row at t_s^r as L^r(t_s^r)≈B'^r/d^r(t_s^r).

These steps in this second exemplary method will be repeated until the last row of B is processed.

Figure 4:
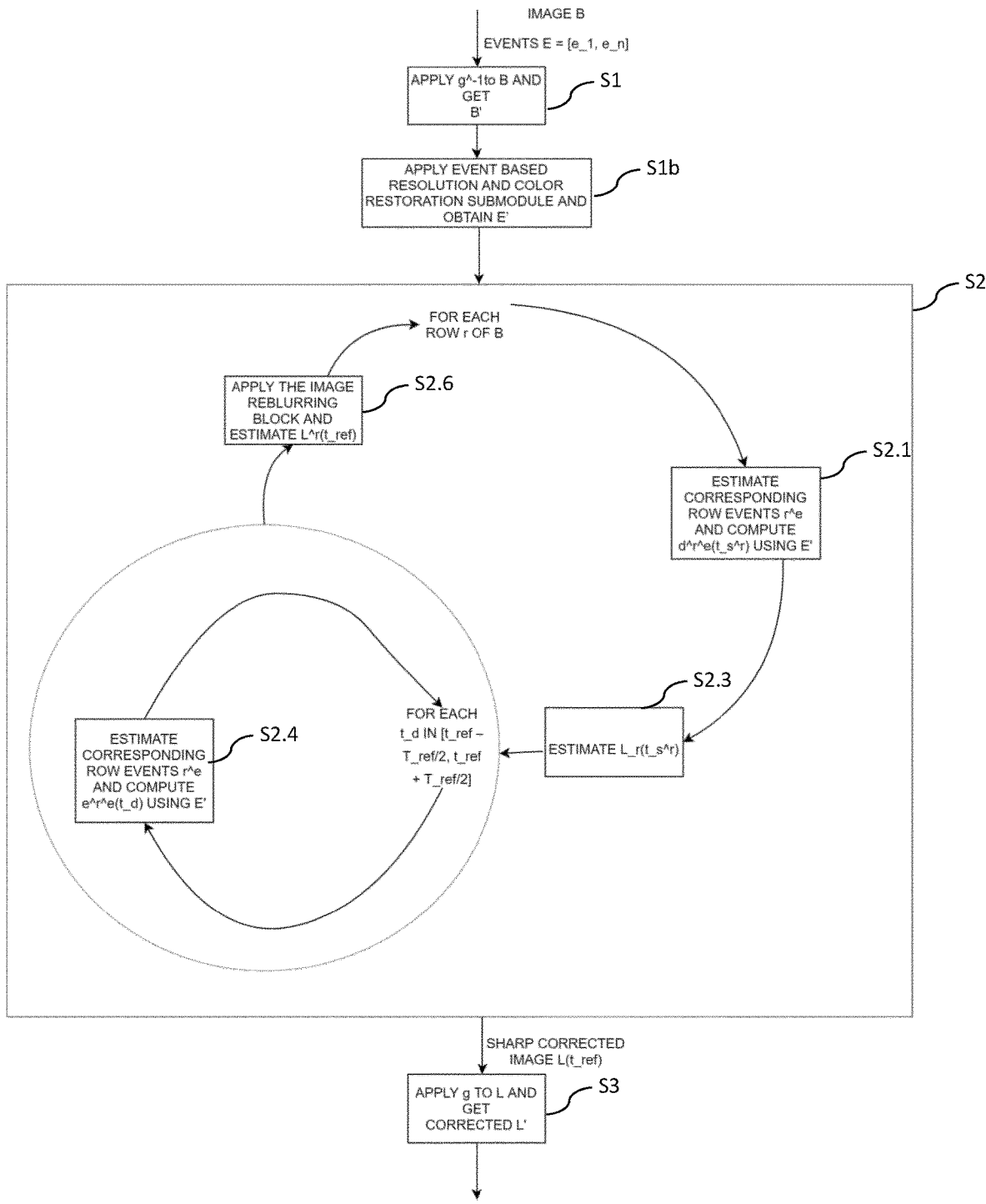
FIG. 4 illustrates a functional block diagram of a third exemplary method according to the invention.

In the above exemplary methods, the intermediate resolution and color restoration submodule is used. Whereas, compared with the exemplary embodiment as shown in FIG. 2, in order to use the event-based resolution and color correction submodule, in a third exemplary method as shown in FIG. 4, the intermediate resolution and color restoration submodule in Step S2.2 and S2.5 are removed from Step S2, and instead the event based resolution and color correction submodule in Step S1b is applied before computing e^r^e(t_s^r) Step S2.1. In particular, as shown in FIG. 4, the event based resolution and color correction submodule in Step S1 b is applied before Step S2, so as to obtain E', i.e. e' as mentioned before in the "Event-Based Resolution and Color Restoration Submodule" section, and in Step S2.1, E' is used to estimate the corresponding row in the event stream r^e, and compute from the event streams a row d^r^e(t_s^r).

Figure 5:
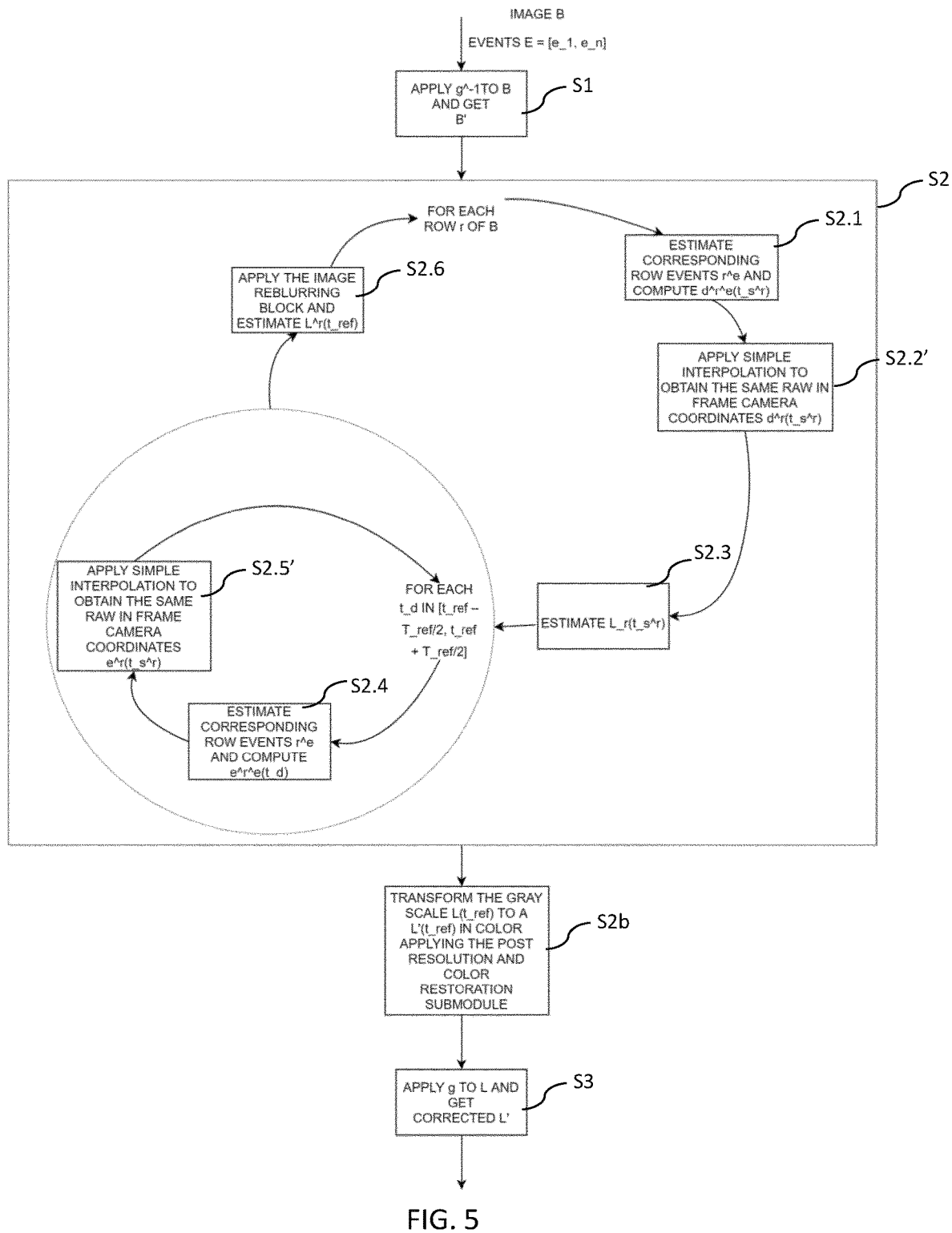
FIG. 5 illustrates a functional block diagram of a fourth exemplary method according to the invention.

As another variant, FIG. 5 shows a fourth exemplary method according to the present invention, wherein the post resolution and color correction submodule is used. In this case, compared with the exemplary embodiment as shown in FIG. 2, the intermediate resolution and color restoration submodule of Step S2.2 and S2.5 are removed and image B is downscaled to the resolution of the events, and intermediate resolution and color restoration submodule is substituted with a simple interpolation in step S2.2' and S2.5', and a step S2b is added to apply the post resolution and color correction module. In particular, as shown in FIG. 5, the post resolution and color correction submodule Step S2b is applied after Step 2, so as to transfer grayscale L to L' in color.

In addition, the present invention also proposes some embodiments of frames enhancement with a fully data-driven approach. In particular, the present invention suggests to deblur, create multiple frames out of a single blurry frame, or enhance the dynamic range of a frame with machine learning models in an end-to-end manner. Using the additional information provided by the event based sensor may reduce model sizes and therefore the amount of computations.

Namely, the present invention proposes the use of machine learning to model:

The transformation of a blurry frame B and the stream of events (e_i)_i=1 ... N inside or outside its exposure duration to the sharp image S at a given time inside or outside of the exposure duration of the blurry frame The transformation of a blurry frame B and the stream of events (e_i)_i=1 ... N during its exposure duration to a set of N sharp frames (S_0, ..., S_N) regularly spaced in time through the blurry frame's exposure duration.

The transformation of a frame F1 along with events (e_i)_i=1 ... N during its exposure duration, or any preprocessing of this stream of events, to a frame F2 having an enhanced dynamic range.

The present invention also proposes the changes to the above mappings where the event buffer (e_i)_i=1 ... N is replaced by any adequate preprocessing.

In addition, with the abovementioned modules, submodules and approaches according to the present invention, in some further embodiments, it is possible to obtain slow-motion videos and videos with enhanced dynamic range, which will be described below.

For the slow-motions videos, the exemplary methods described above can generate an artifact free image at a certain time t_ref. However, it is also possible to generate more than one corrected image in output for each image in input. Therefore, an embodiment according to the present invention can generate several frames in output and increase the frame rate of the generated video, as shown in the following FIG. 6.

Figure 6:
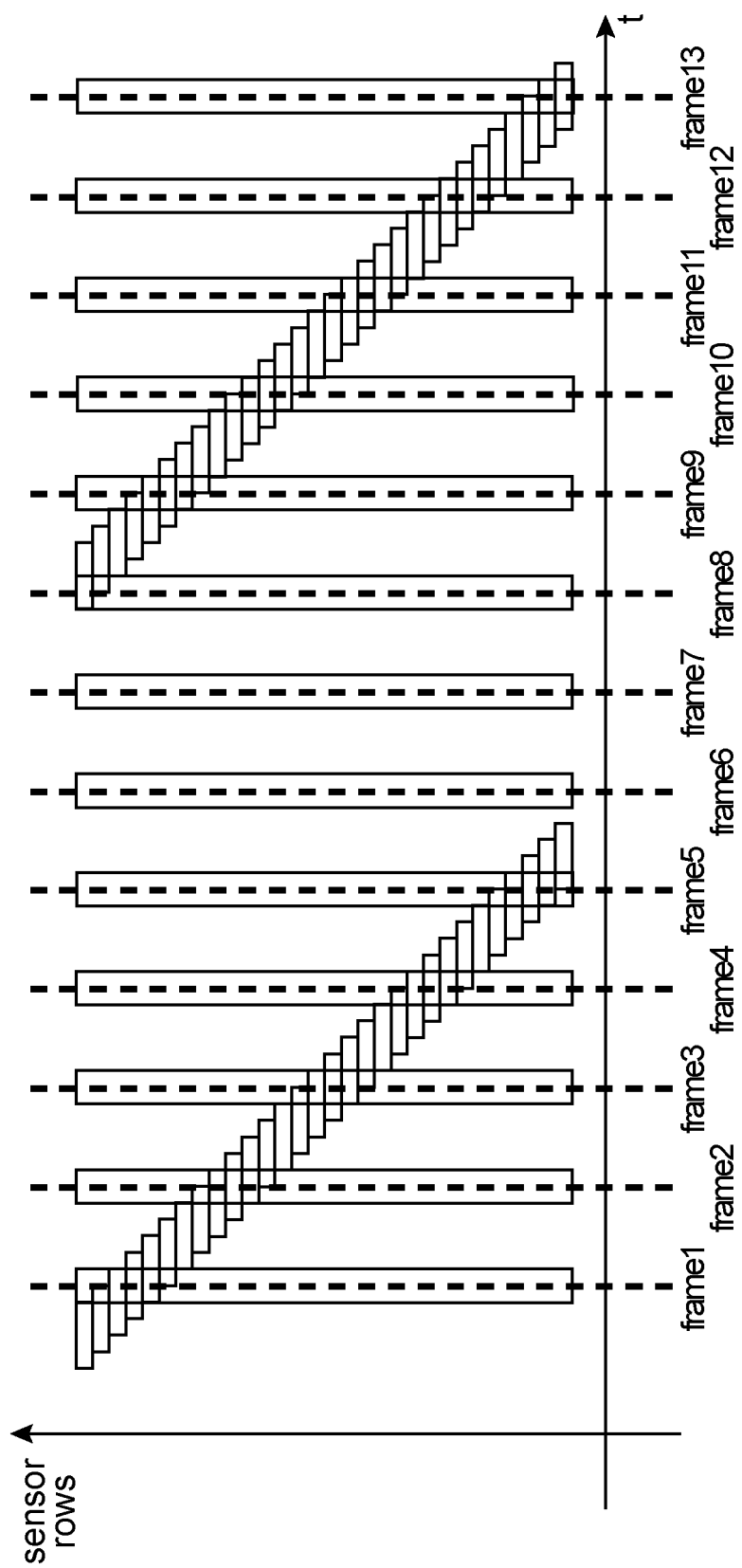
FIG. 6 illustrates exposure windows for two images captured by a frame based sensor and for multiple images corrected by the method according to the invention.

FIG. 6 shows the exposure windows for two consecutive images captured by a frame based camera. Similar to the one in FIG. 1, it consists of inclined blacks elements representing exposure windows for each row of a rolling shutter, and they are transformed into a plurality of corrected exposure windows, i.e. light gray vertical bar, at 13 different times, representing 13 frames at these different times, so that the frame rate is greatly increased.

Therefore, it is possible to generate a high frame rate video, without putting a constraint on the exposure duration as it happens when shooting high frame rate videos with a frame camera only (as the exposure duration must be smaller than 1/(number of frames per second)). By using the present invention, it is possible to first shoot, for example, a 60 frames-per-second video (therefore with maximum exposure of 16 ms), and then generate a video with a different (typically higher) number of frames-per-second, with the maximum number of frames-per-second being only constrained by the time resolution of the event camera.

For the videos with enhanced dynamic range, in addition to the above mentioned embodiment which aims at enhancing the generation of a frame with only another frame in input and a stream of events, it is also possible to align and merge several images (or frames) captured in sequence by the sensor. Using several images corrected/enhanced by the present invention allows to improve the quality of the images or videos and extend their dynamic range.

This improves the methods in the art where several frames are acquired and spatially aligned before being averaged to reduce the image noise. The alignment is difficult to obtain when the scene changes during the frame acquisitions, because of moving objects in the scene or because of relative motion between the scene and the camera. The methods in the art generally use computationally intensive motion estimation and motion compensation to bring the frames into alignment. In the present invention, it is possible to use an event stream and the image time shifting module to "align" several frames to a unique t_ref in a more efficient way without explicit motion compensation.

The present invention is particularly advantageous when the exposure duration changes between frame acquisitions. Changing the exposure durations is often used to better capture the dynamic range of a scene: if the highest and lowest brightness of a scene exceed the highest and lowest light intensity representable in a single exposure due to physical limitations of the (frame-based) sensor, it is common to capture N frames with different exposure durations E_i, i \in [0, N), and merge them into one "composite" frame, thus combining both the highest and lowest light intensities into a single frame. The varying exposures of the N frames make the alignment even more difficult for the motion compensation techniques in the art.

In this case, the modules and methods mentioned above can be used to capture several images of a scene and align them to a unique target time t_ref so as to obtain a high-dynamic-range (HDR) result.

Therefore, the invention proposes using a combination of a traditional frame based image sensor and an event based sensor, such as a DVS sensor, to generate image/video frame and a stream of events, and then combine the image/video frame with the event data, so as to remove artifacts more efficiently and enhance the dynamic range.

Moreover, the aforementioned modules/methods, according to the present invention, can be implemented in many ways, such as program instructions for execution by a processor, as software modules, microcode, as computer program product on computer readable media, as logic circuits, as application specific integrated circuits, as firmware, etc. The embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the embodiments of the invention can take the form of a computer program product accessible from a computer-usable or computer-readable medium providing program code for use by or in connection with a computer, processing device, or any instruction execution system. For the purposes of this description, a computer-usable or computer readable medium can be any apparatus that can contain, store, communicate, or transport the program for use by or in connection with the instruction execution system, apparatus, or device. The medium can be electronic, magnetic, optical, or a semiconductor system (or apparatus or device). Examples of a computer-readable medium include, but are not limited to, a semiconductor or solid state memory, magnetic tape, a removable computer diskette, a RAM, a read-only memory (ROM), a rigid magnetic disk, an optical disk, etc. Current examples of optical disks include compact disk-read-only memory (CD-ROM), compact disk-read/write (CD-RAN) and DVD.

The embodiments described hereinabove are illustrations of this invention. Various modifications can be made to them without leaving the scope of the invention which stems from the annexed claims.

The invention claimed is:

1. An image enhancement method, comprising:
capturing a reference image frame of a scene, by a frame-based rolling shutter sensor including rows of sensor elements, wherein the reference image frame contains artifacts and has an exposure duration;
obtaining a stream of events, by an event-based sensor which is synchronized with the frame-based sensor, at least during the exposure duration, wherein the events encode brightness changes of the scene corresponding to the reference image; and
deriving a corrected image frame without the artifacts by processing each row of the reference image frame using the stream of events.

2. The image enhancement method according to claim 1, wherein the reference image frame is obtained at a reference time, and the step of deriving a corrected image frame comprises a step of image time shifting, wherein the reference image frame is shifted to the corrected image frame at a target time-w inside or outside the exposure duration by establishing a relationship between the events and the reference image frame and accumulating the brightness changes encoded by the events obtained during a time interval between the reference time and the target time.

3. The image enhancement method according to claim 1, wherein the reference image frame is a blurry frame, and the method comprises a step of image deblurring to transform the blurry frame into a sharp frame.

4. The image enhancement method according to claim 1, wherein the method comprises a step of reblurring the corrected image frame.

5. The image enhancement method according to claim 1, wherein the method comprises a step of non-linear compensation for compensating non-linear processing in the reference image frame and in the events.

6. The image enhancement method according to claim 1, wherein the reference image frame has a first resolution and/or a first color space, and the stream of events has a second resolution and/or a second color space, which are different from the first resolution and/or the first color space, and wherein the method further comprises a step of resolution and color restoration for compensating resolution and/or color space differences between the reference image frame and the stream of events.

7. The image enhancement method according to claim 1, wherein the method comprises generating a plurality of corrected image frames distributed at different time inside or outside the exposure duration.

8. The image enhancement method according to claim 1, wherein the method comprises aligning a plurality of corrected image frames derived in different exposure durations.

9. An image enhancement system, comprising:
a frame-based rolling shutter sensor including rows of sensor elements, configured to obtain a reference image which contains artifacts and has an exposure duration;
an event-based sensor synchronized with the frame-based sensor, at least during the exposure duration, configured to obtain a stream of events encoding brightness changes of the scene corresponding to the reference image at least during the exposure duration; and
processor programmed to derive a corrected image frame without the artifacts from the reference image using the stream of events.

10. The image enhancement system according to claim 9, wherein the reference image is obtained at a reference time, and the processor is programmed to time shift the reference image frame to the corrected image frame at a target time inside or outside the exposure duration by establishing a relationship between the events and the reference image frame and accumulating the brightness changes encoded by the events obtained during a time interval between the reference time and the target time.

11. The image enhancement system according to claim 9, wherein the processor is programmed for compensating non-linear processing in the reference image frame and in the events.

12. The image enhancement system according to claim 9, wherein the reference image has a first resolution and/or a first color space, and the stream of events has a second resolution and/or a second color space, which are different from the first resolution and/or the first color space, and wherein the processor is programmed to compensate for resolution and/or color space differences between the reference image and the stream of events.

13. An image enhancement method, comprising the steps of:
- capturing a reference image frame of a scene at a reference time, by a frame-based sensor, wherein the reference image frame contains artifacts and has an exposure duration;
- obtaining a stream of events, by an event-based sensor which is synchronized with the frame-based sensor, at least during the exposure duration, wherein the events encode brightness changes of the scene corresponding to the reference image; and
- deriving a corrected image frame without the artifacts from the reference image frame using the stream of events;
- wherein the step of deriving the corrected image frame comprises time shifting the reference image frame to the corrected image frame at a target time inside or outside the exposure duration by establishing a relationship between the events and the reference image frame and accumulating the brightness changes encoded by the events obtained during a time interval between the reference time and the target time.

14. The image enhancement method according to claim 13, wherein the reference image frame is a blurry frame, and the method comprises a step of image deblurring to transform the blurry frame into a sharp frame.

15. The image enhancement method according to claim 13, wherein the method comprises a step of reblurring the corrected image frame.

16. The image enhancement method according to claim 13, wherein the method comprises a step of non-linear compensation for compensating non-linear processing in the reference image frame and in the events.

17. The image enhancement method according to claim 13, wherein the reference image frame has a first resolution and/or a first color space, and the stream of events has a second resolution and/or a second color space, which are different from the first resolution and/or the first color space, and wherein the method further comprises a step of resolution and color restoration for compensating resolution and/or color space differences between the reference image frame and the stream of events.

* * * * *